(12) United States Patent
Shishido

(10) Patent No.: US 10,674,076 B2
(45) Date of Patent: Jun. 2, 2020

(54) MEASURING APPARATUS AND SYSTEM FOR CONSTRUCTING THREE-DIMENSIONAL MODEL

(71) Applicant: TOPCON CORPORATION, Tokyo (JP)

(72) Inventor: Takashi Shishido, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 297 days.

(21) Appl. No.: 15/165,790

(22) Filed: May 26, 2016

(65) Prior Publication Data

US 2017/0026576 A1    Jan. 26, 2017

(30) Foreign Application Priority Data

May 29, 2015  (JP) .................................. 2015-109250

(51) Int. Cl.
*H04N 5/232*  (2006.01)
*H04N 5/247*  (2006.01)
*H04N 5/225*  (2006.01)

(52) U.S. Cl.
CPC ....... *H04N 5/23238* (2013.01); *H04N 5/2251* (2013.01); *H04N 5/247* (2013.01)

(58) Field of Classification Search
None
See application file for complete search history.

(56) References Cited

U.S. PATENT DOCUMENTS

| 2005/0060069 | A1* | 3/2005 | Breed | B60N 2/2863 701/408 |
| 2012/0200722 | A1* | 8/2012 | Kozlov | B66F 11/048 348/208.7 |
| 2014/0160274 | A1* | 6/2014 | Ishida | G01S 19/14 348/113 |

OTHER PUBLICATIONS

Puente I, González-Jorge H, Martínez-Sánchez J, Arias P. Review of mobile mapping and surveying technologies. Measurement. Aug. 1, 2013;46(7):2127-45. (Year: 2013).*
Chambers A, Achar S, Nuske S, Rehder J, Kitt B, Chamberlain L, Haines J, Scherer S, Singh S. Perception for a river mapping robot. InIntelligent Robots and Systems (IROS), 2011 IEEE/RSJ International Conference on Sep. 25, 2011 (pp. 227-234). IEEE. (Year: 2011).*
Topcon Corporation—"Topcon Innovation Japan 2014"—URL : http://www.topcon.co.jp/topics/20141218-17334.html; Dec. 12, 2014.

(Continued)

*Primary Examiner* — Clifford Hilaire
(74) *Attorney, Agent, or Firm* — Roberts Calderon Safran & Cole P.C.

(57) ABSTRACT

To provide a measuring apparatus 1 and a system 100 for constructing a three-dimensional model which are compact and are capable of obtaining data in a wide range while preventing the cameras and scanners from entering the data. The measuring apparatus 1 and the system 100 include an inertia measuring unit 30, an omnidirectional camera 10 for photographing scenery of an upward direction and a sideward direction, and a scanner 20 for scanning scenery over 360 degrees in a circumferential direction, wherein the omnidirectional camera 10 is disposed above the inertia measuring unit 30 and the scanner 20 is disposed in an upward and sideward direction of the omnidirectional camera 10.

13 Claims, 11 Drawing Sheets

(56) References Cited

OTHER PUBLICATIONS

Topcon Corporation—News release—URL : http://www.topcon.co.jp/news/20141215-17327.html; Dec. 15, 2014.
Topcon Corporation—"Topcon Sokkia Positioning Japan Roadshow 2015"—URL : http://www.topcon.co.jp/event/20150212-17400.html; Feb. 26, 2015-Mar. 13, 2015.
Topcon Corporation—Product information—URL : http://www.topcon.co.jp/positioning/products/product/3dscanner/ip-s3_hd1.html; Mar. 31, 2015.
Topcon Corporation—Product catalog—URL : http://www.topcon.co.jp/positioning/products/pdf/IP-S3HD1_J.pdf; Apr. 10, 2015.
http://www.topcon.co.jp/positioning/products/pdf/IP-S2_Standard-plus_J.pdf; May 8, 2015.

\* cited by examiner

MEASURING APPARATUS AND SYSTEM FOR CONSTRUCTING THREE-DIMENSIONAL MODEL

CROSS-REFERENCE TO RELATED APPLICATION

This application is based on and claims priority to a Japanese Patent Application No. 2015-109250 filed on May 29, 2015, the disclosure of which is incorporated by reference herein.

TECHNICAL FIELD

The present invention relates to a measuring apparatus and a system for constructing a three-dimensional model of geographical scenery for use in, for example topographic survey, measurement, or mobile-mapping.

BACKGROUND ART

A typical measuring apparatus for constructing a three-dimensional model includes a camera, a scanner, and an inertia measuring unit for measuring inertia such data as acceleration and inclination of the measuring apparatus. A measuring system for constructing a three-dimensional model constructs the three-dimensional model of the geographical scenery from image data and point cloud data of the geographical scenery obtained by moving the measuring apparatus in the site of measurement and by composing the point cloud data into the image data.

Therefore, such measuring apparatus is generally equipped with a plurality number of cameras and scanners to photograph a wide range of the scenery and the measuring apparatus must be provided with a layout that any one of the cameras and the scanners will not be taken into another camera or scanner. Thus, for example, in a measuring apparatus disclosed in non-Patent Publication 1, there are provided a plurality of uni-dimensional laser scanners disposed in a circumferential direction underneath the measuring apparatus, an inertia measuring unit disposed on an upper portion of the scanners, and an omnidirectional camera in the form of a plurality of cameras integrated on an upper surface of the inertia measuring unit.

PRIOR ART DOCUMENTS

Patent Publications

Non-Patent Publication 1:
[http://www.topcon.co.jp/positioning/products/pdf/IP-S2_Standard-plus_J.pdf] (Retrieved on May 8, 2015.)

SUMMARY OF INVENTION

Problems to be Solved by Invention

Unfortunately, for the reasons mentioned the above, a conventional measuring apparatus for constructing a three-dimensional model has a tendency to be a disadvantageously large size which makes it difficult to fix the measuring apparatus on a vehicle because the measuring apparatus is used while moving.

The present invention has been made based on the problem of the conventional art, and an object thereof is to provide a measuring apparatus and a system for constructing a three-dimensional model which are compact and capable of obtaining data in a wide range while preventing the cameras and scanners from entering the data.

Means of Solving Problems

To overcome prior art problems, it is an object of the present invention to provide a measuring apparatus for constructing a three-dimensional model including an inertia measuring unit for measuring inertia of the measuring apparatus, an omnidirectional camera for photographing scenery of an upward direction and a sideward direction, and a scanner for scanning scenery over 360 degrees in a circumferential direction, wherein the omnidirectional camera is disposed above the inertia measuring unit and the scanner is disposed in an upward and sideward direction of the omnidirectional camera.

In the measuring apparatus, preferably, the scanner is disposed outside area of viewing angles of an upper camera that photographs the scenery of the upward direction and of a side camera that photographs the scenery of the sideward direction of the omnidirectional camera.

In the measuring apparatus, preferably, the scanner is fixed on a head portion of the omnidirectional camera.

In the measuring apparatus, preferably, the scanner has a rotation axis inclined at an angle of 45 degrees with respect to a vertical direction.

It is another object of the present invention to provide a system for constructing a three-dimensional model including a measuring apparatus including an inertia measuring unit for measuring inertia of the measuring apparatus, an omnidirectional camera for photographing scenery of an upward direction and a sideward direction, the camera being fixed on an upper surface of the inertia measuring unit, and a scanner for scanning scenery over 360 degrees in a circumferential direction, the scanner being fixed on a rear end of a head portion of the omnidirectional camera and oriented to an upward and sideward direction, and a vehicle equipped with the measuring apparatus on a rear portion of a roof of the vehicle.

In the system, preferably, the measuring apparatus further comprises a stand provided on its side with an inclined portion, and the measuring apparatus is fixed on the vehicle by means of a frame having a pawl-shape arm adapted to engage with the inclined portion.

Effect of Invention

An inventive measuring apparatus and system for constructing a three-dimensional model are compact and capable of obtaining data in a wide range while preventing one of the cameras and scanners from being taken into the other.

EMBODIMENTS FOR IMPLEMENTING INVENTION

Preferred embodiments of the present invention will be described referring to the annexed drawings.

Embodiments of Measuring Apparatus

Figure 1:
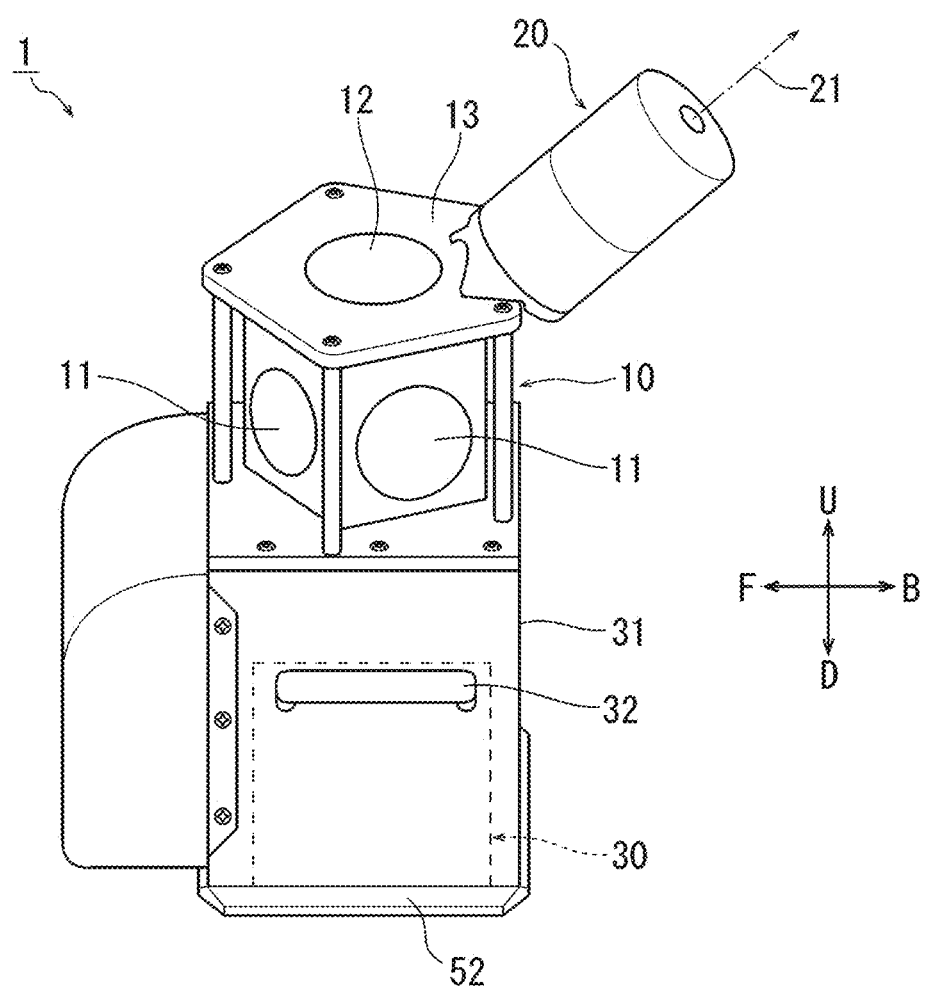
FIG. 1 A perspective view of a measuring apparatus in accordance with the embodiment.

In FIG. 1, a reference number 1 denotes a measuring apparatus for constructing a three-dimensional model regarding the embodiment (hereinafter, referred to as just "measuring apparatus"). The measuring apparatus 1 includes an omnidirectional camera 10, a scanner 20, and an inertia measuring unit 30. An arrow "F" in Figures is a forward direction, an arrow "B" is a backward direction, an arrow "R" is a rightward direction, an arrow "L" is a leftward direction, an arrow "U" is an upward direction, and an arrow "D" is a downward direction. In FIG. 1, a reference number 32 denotes a grip for carrying the measuring apparatus 1. A reference number 52 is a stand for fixing the measuring apparatus 1 on a vehicle described later.

The omnidirectional camera 10 includes side cameras 11 for obtaining scenery images of sideward directions of the camera 10 in a circumferential direction over 360 degrees and an upper camera 12 for obtaining scenery image of an upward direction of the camera 10. In the embodiment, five side cameras 11 disposed in a regular pentagonal geometry in the plan view and the upper camera 12 disposed on the side cameras 11 are integrated in form a single unit. Each of the side cameras 11 and the upper camera 12 is a digital camera and is equipped with an image sensor such as a CCD camera or a CMOS sensor. Image data obtained by the cameras 11 and 12 are outputted as digital signals. Then, pixel coordinates of the image data are specified, a moving image and a static image are obtained. Each of the side cameras 11 has a viewing angle "θ 11" in the upward and downward direction. The upper camera 12 has a viewing angle "θ 12" in the forward and backward direction. The number of the side camera and the upper camera may be changed in accordance with the view angle of the cameras.

The scanner 20 is a rotating type razer scanner (for example, HDL-32e razer scanner manufactured by Velodyne company) and is capable of rotary scanning with a plurality of laser beams. The scanner 20 obtains point cloud data of the scenery over 360 degrees in its circumferential direction with a viewing angle "θ 20" about an axis perpendicular to the rotation axis 21.

The inertia measuring unit 30 is well known as an IMU unit. The inertia measuring unit 30 is equipped with an accelerometer and a gyro capable of obtaining data regarding in three axes and are disposed in a cube 31. The inertia measuring unit 30 obtains acceleration and angular speed of the measuring apparatus 1 in three-dimension.

Figure 2:
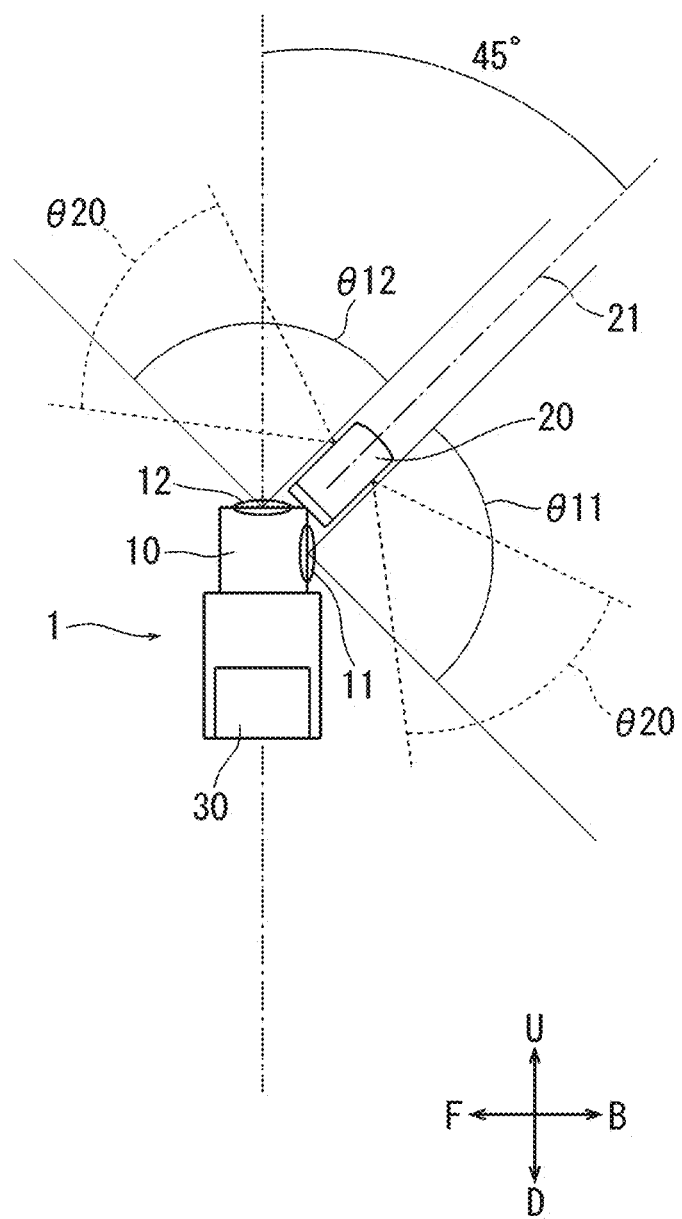
FIG. 2 An illustration showing a view angle of the measuring apparatus in FIG. 1.

The omnidirectional camera 10 is fixed on an upper surface of the cube 31 of the inertia measuring unit 30 by a screw. The scanner 20 is fixed on a rear end of a head portion 13 of the omnidirectional camera 10 by a screw. A rotation axis 21 of the scanner 20 is inclined at an angle of 45 degrees toward the backward direction with respect to a vertical direction (refer to FIG. 2). The screw may be changed to a preferable fixing way.

Next, the reason why the layout described the above is preferable will be described. As showing in FIG. 2, each of the side cameras 11 obtains the image data of scenery of the viewing angle "θ 11" in the upward and downward direction. The upper camera 12 is capable of obtaining the image data of scenery of the viewing angle "θ 12" in the forward and backward direction. Each of the viewing angles "θ 11" and "θ 12" is approximately 90 to 110 degrees. The scanner 20 obtains the point cloud data of the scenery in the viewing angle "θ 20" in the vertical direction of the scanner 20. The viewing angle "θ 20" is approximately 40 to 50 degrees.

Firstly, since the scanner 20 is disposed in the upward and sideward direction of the omnidirectional camera 10, the scanner 20 is located in dead angle areas of the side cameras 11 and the upper camera 12. Therefore, the image of the scanner 20 is prevented from taken into any one of the side cameras 11 or the upper camera 12. Similarly, since the omnidirectional camera 10 is also located in dead angler area of the scanner 20, the images of the side cameras 11 and the upper camera 12 do not come into the scanner 20. Moreover, since the inertia measuring unit 30 is disposed directly below the omnidirectional camera 10, the image of the inertia measuring unit 30 comes into neither the scanner 20 nor the omnidirectional camera 10.

Secondly, the scanner 20 may be disposed at any distance from the omnidirectional camera 10 as long as the scanner 20 is in an area of the upward and sideward direction of the omnidirectional camera 10. The closer to the omnidirectional camera 10 the scanner 20 is located, the less the scanner 20 is captured in the image data of the omnidirectional camera 10. Therefore, it is preferable to fix the scanner 20 directly on the head portion 13 of the omnidirectional camera 10, and to dispose a light emitting section of the scanner 20 at a position as closer to the omnidirectional camera 10 as possible.

Thirdly, in fixing the scanner 20 in the upward and sideward direction of the omnidirectional camera 10, it is confirmed that the rotation axis 21 is most preferably inclined at 45 degrees plus or minus 15 degrees with respect to the vertical direction in order to prevent the omnidirectional camera 10 and the scanner 20 from being taken (as visible objects) into a resultant composed image obtained.

In this manner, with the measuring apparatus 1 arranged as described the above, it is possible to reduce data loss due to interfusion of the images of the scanner 20 and the omnidirectional camera 10 and obtain the data efficiently. Furthermore, the layout of the above arrangement is very compact as compared with that of a conventional measuring apparatus (such as the measuring apparatus disclosed in the non-patent publication 1).

Embodiments of System

Figure 3:
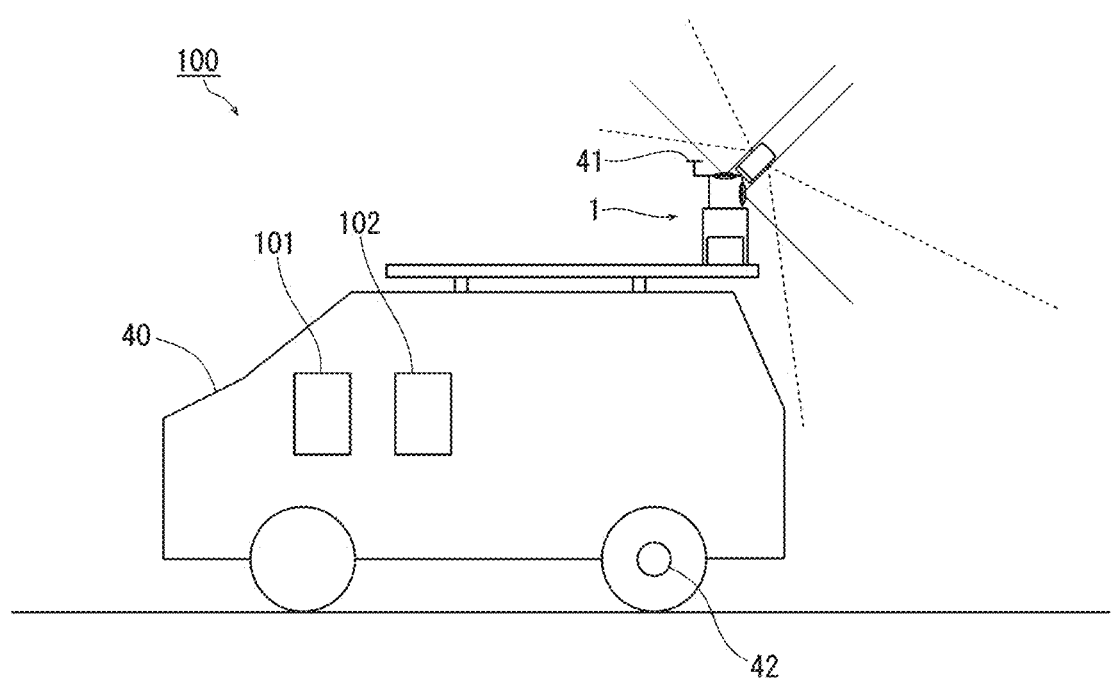
FIG. 3 A brief configuration of a measuring system for constructing a three-dimensional model in accordance with the embodiment.
Figure 4:
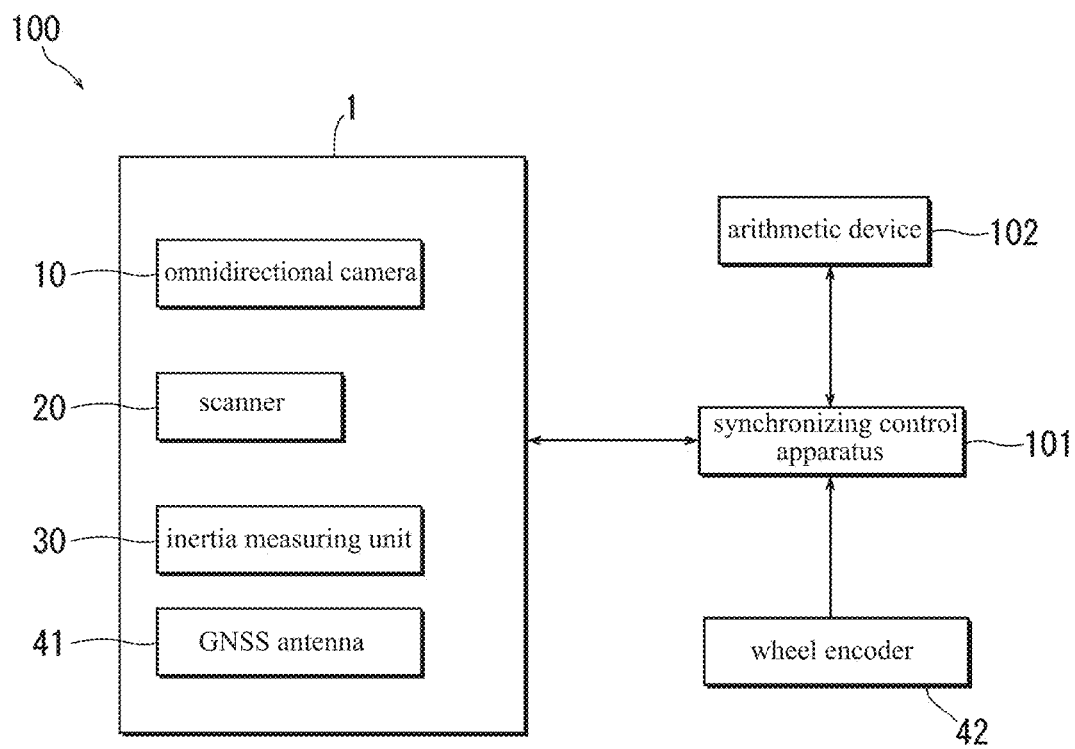
FIG. 4 A block diagram of the system in FIG. 3.

The embodiments relates a system for constructing a three-dimensional model 100 equipped with the measuring apparatus 1 on a car 40 (hereinafter, referred to as just "system 100"). The configurations which are similar to that of the embodiment described above are omitted by using the same reference number. As shown in FIGS. 3 and 4, the system 100 includes the measuring apparatus 1, a synchronizing control apparatus 101, an arithmetic device 102, and the car 40.

In the measuring apparatus 1 of the embodiment, a GNSS antenna 41 for obtaining locational information of the car 40 is fixed on a front end of the head portion 13 of the omnidirectional camera 10. The GNSS antenna 41 is disposed in the upward and sideward direction of the camera 10. The car 40 is provided with a wheel encoder 42.

The measuring apparatus 1 including the omnidirectional camera 10, the scanner 20, the inertia measuring unit 30, and the GNSS antenna 41 is connected to the synchronizing control apparatus 101 via a cable. The synchronizing control apparatus 101 synchronizes the omnidirectional camera 10, the scanner 20, and the inertia measuring unit 30 to obtain time data of image data, point cloud data, and inertia data, respectively. The synchronizing control apparatus 101 is connected to the arithmetic device 102 such as a personal computer by wired or wireless communication. The arithmetic device 102 constructs a three-dimensional model by composing the point cloud data into the image data based on the time information obtained by the synchronizing control apparatus 101. In the construction, the arithmetic device 102 performs, for example, an image processing for extracting specific points in the image data obtained by the omnidirectional camera 10, a tracking processing for tracking the specific points in the moving image, a photogrammetry survey processing, and a correction processing for correcting length in the image data based on a known length in the image data. Data detected by the GNSS antenna 41 and the wheel encoder 42 are outputted to the synchronizing control apparatus 101 via a cable to synchronize the GNSS antenna 41 and the wheel encoder 42. The arithmetic device 102 calculates accurate moving distance while comparing moving distance obtained by GPS with moving distance obtained by a rotating speed of the wheel encoder 42 constantly and uses the accurate moving distance in the construction of the three-dimensional model.

The synchronizing control apparatus 101 and the arithmetic device 102 are prepared near a worker in the car 40. The measuring apparatus 1 is fixed on a rear portion of a roof of the car 40. Preferably, when a car is used as a vehicle in the system 100, the measuring apparatus 1 is fixed on the roof of the vehicle and on the rear portion of the roof because an image of the car 40 is taken into neither the scanner 20 nor the omnidirectional camera 10, and the system 100 is capable of obtaining data in a wide range.

Figure 5:
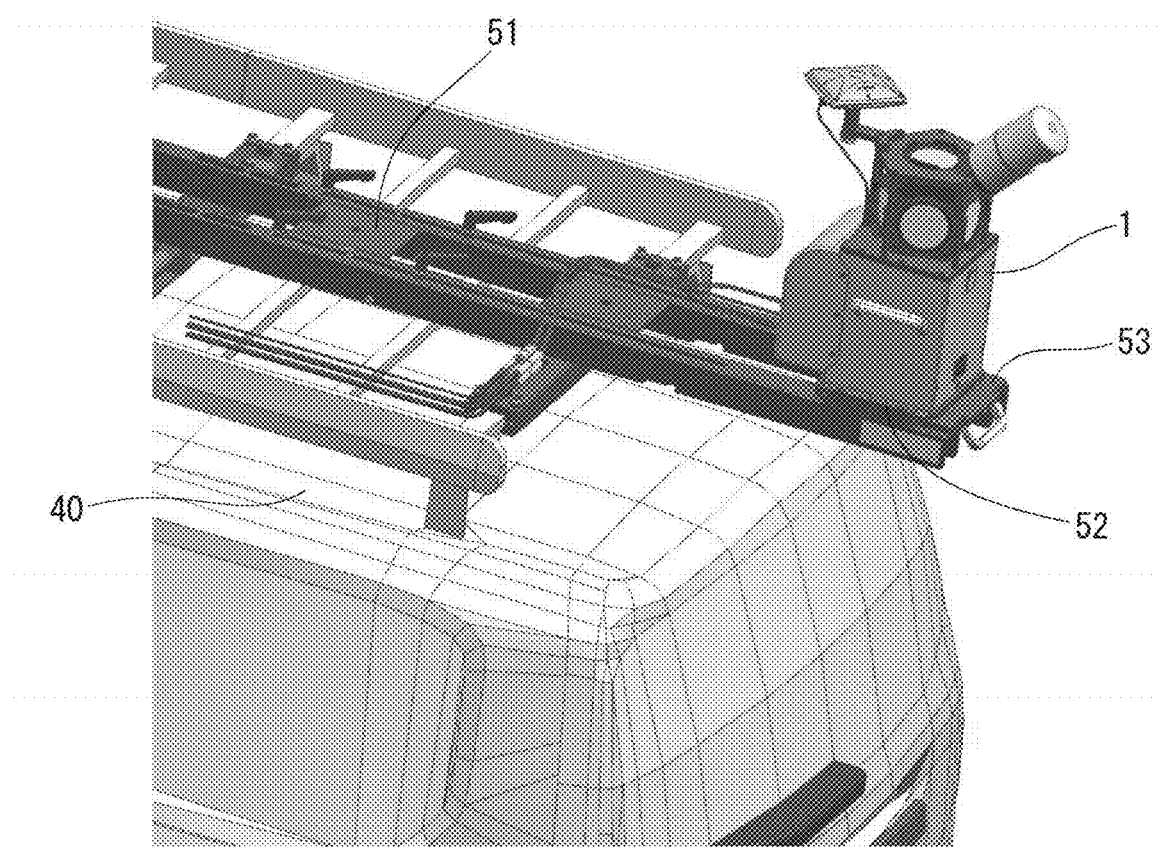
FIG. 5 A perspective view of the system including a fixing tool in FIG. 3.

Next, a preferred configuration to fix the measuring apparatus 1 on the car 40 will be described referring to the FIGS. 5 to 10. As shown in FIG. 5, the measuring apparatus 1 is fixed on the car 40 by means of a mount 51, a stand 52, and a frame 53.

Figure 6:
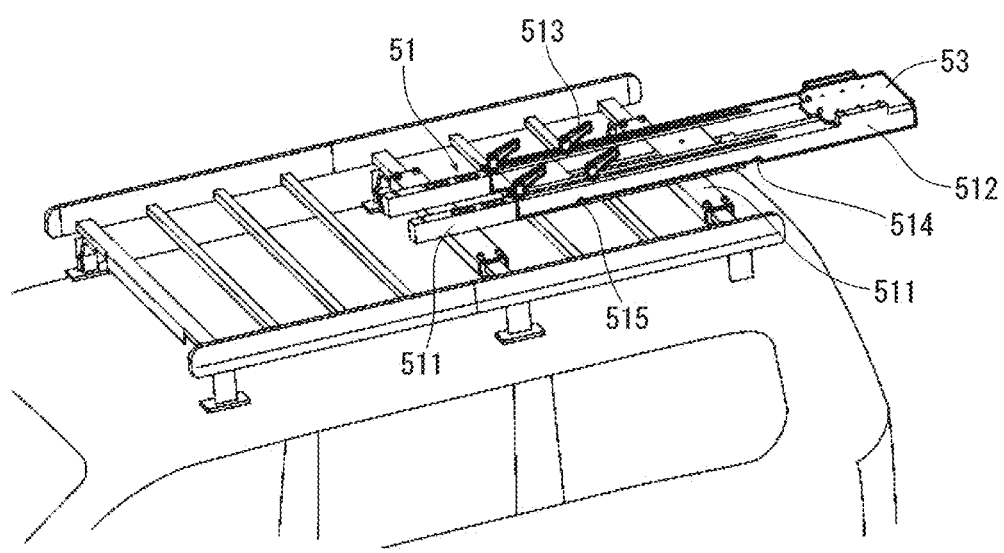
FIG. 6 A perspective view showing condition of the fixing tool extending in FIG. 5.
Figure 7:
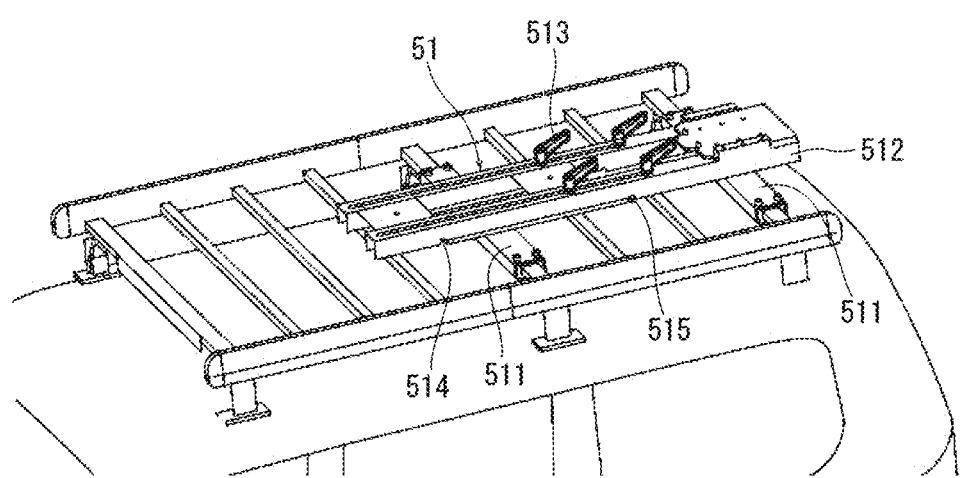
FIG. 7 A perspective view showing condition of the fixing tool shrinking in FIG. 5.

As shown in FIGS. 6 to 7, the mount 51 includes a mounting base 511, a slide portion 512, and clamp portions 513. FIG. 6 shows a state extending the slide portion 512. FIG. 7 shows a state shrinking the slide portion 512. The mounting base 511 has a pair of base bars and a pair of slide rails. The base bars are adapted to clamp a ladder on the roof of the car 40 by screws. The slide rails are supported by the base bars and are equipped with the clamp portions 513 in substantially center portion of the slide portion 512. The slide portion 512 is equipped with the frame 53 on a rear end thereof and is capable of sliding in the forward and backward direction by fastening or loosening levers of the clamp portions 513. The slide portion 512 is equipped with positioning ribs 514 at two positions, a forward side and a backward side. The positioning ribs 514 engage with positioning pins 515 formed on the mounting base 511 for positioning in the forward and backward direction.

Figure 8:
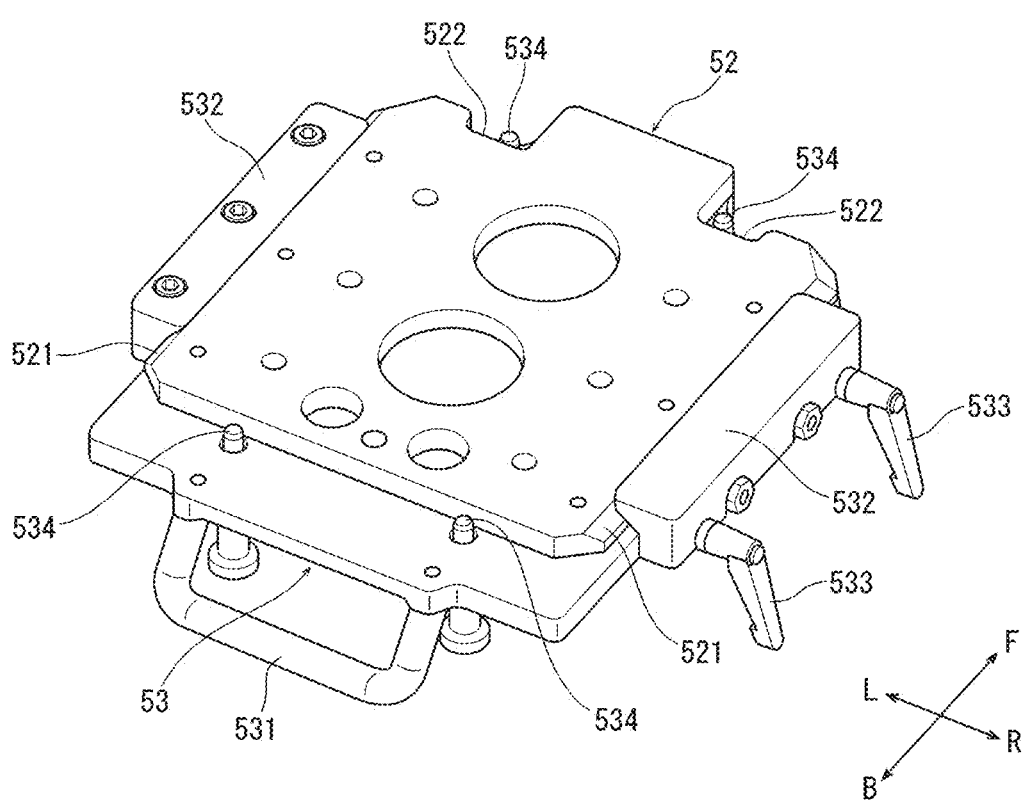
FIG. 8 A perspective view of a required part of the fixing tool in FIG. 5.
Figure 9:
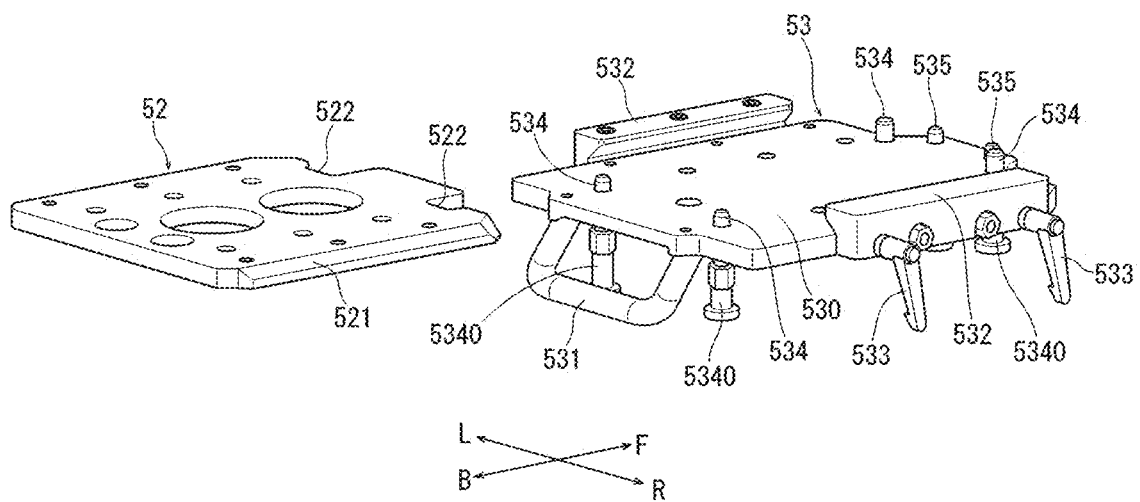
FIG. 9 A exploded perspective view of the required part of the fixing tool in FIG. 5.
Figure 10:
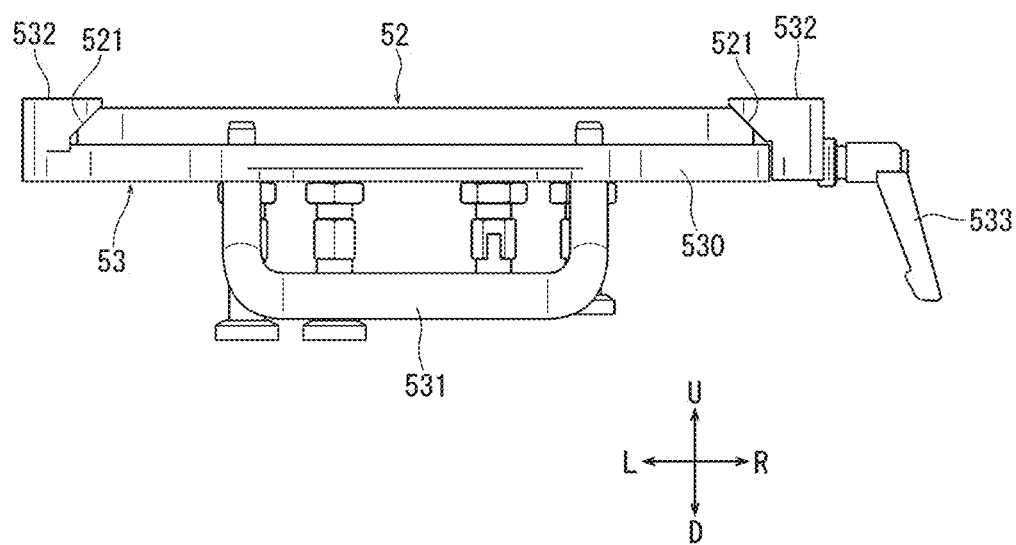
FIG. 10 A right side view of the required part of the fixing tool in FIG. 5.

As shown in FIGS. 8 to 10, the measuring apparatus 1 is fixed to the mount 51 by means of the stand 52 and the frame 53. The stand 52 is preset on an under surface of the measuring apparatus 1 (refer to FIG. 1. The measuring apparatus 1 is eliminated in FIGS. 8 to 10). The stand 52 is provided on its right and left surfaces respectively with an inclined portion 521 which extends laterally from the upper surface to the bottom surface. The inclined portion 521 is adapted to engage with arms 532 of the frame 53. Concaves 522 recessed backward are formed in a front surface of the stand 52 at positions corresponding to convex pins 534 described later.

The frame 53 includes a base 530, a handle 531, arms 532, and arm clamps 533, convex pins 534, and positioning pins 535.

The handle 531 is extended in the downward and backward direction from the base 530 and is used for sliding the frame 53. Each of the arms 532 projects upward from right and left end of the base 530. An inner surface of each of the arms 532 is a pawl-shape which extends inwardly from the bottom to the top end of the arms 532. The arms 532 are capable of engaging with the incline portions 521 of the stand 52. While the arm clamps 533 in the embodiment are formed on the right side arm 532, the arm clamps 533 may be formed on the left side or both sides. A pointed end of the convex pins 534 projects from the upper surface of the base 530. Spring units 5340 are formed below the base 530. The convex pins 534 are formed at four positions, at the forward, backward, rightward, and leftward position of the base 530. The positioning pins 535 are formed on the upper surface of the base 530 in front of the convex pins 534 formed at the forward position and engage with positioning hollows (omitted in Figures) formed on a reverse surface of the stand 52.

In the site of fixing, firstly, a worker fixes the measuring apparatus 1 on the frame 53 of the slide portion 512. When the measuring apparatus 1 is loaded on the stand 53 while using the positioning pins 535 and the convex pins 534 acting as a guide, the spring units 5340 shrink, and the convex pins 534 project upward by own weight of the measuring apparatus 1. Then, the stand 52 is certainly fixed on the frame 53 in the forward-backward direction and the rightward-leftward direction. Next, the worker tightens the arm clamps 533 by his hand. Then, the stand 52 is fixed on the frame 53. Finally, the worker fits the slide portion 512 to the mounting base 511 and tightens the clamp portions 513. In this manner, the measuring apparatus 1 can be attached to the car 40 by hand through all steps. Preferably, the measuring apparatus 1 is used with the extending state as shown in FIG. 6 during the measurement, and is used with the shrinking state as shown in FIG. 7 during non-measurement.

On the other hand, when the measuring apparatus 1 is unload from the car 40, the worker loosens the arm clamps 533 after removing the slide portion 512 from the mounting base 511. Then, the stand 52 is pushed up by the biasing force of the spring units 5340, the measuring apparatus 1 is easily removed from the stand 53. In this manner, unloading the measuring apparatus 1 from the car 40 is very easy. Moreover, since all parts regarding the system 100 can be removed from the car 40, the all parts regarding the system 100 can be carried. In addition, the car 40 is not only for use for the system 100. The system 100 can be installed later to a general-purpose car.

An Alternative Example

An alternative example will be described.

Figure 11:
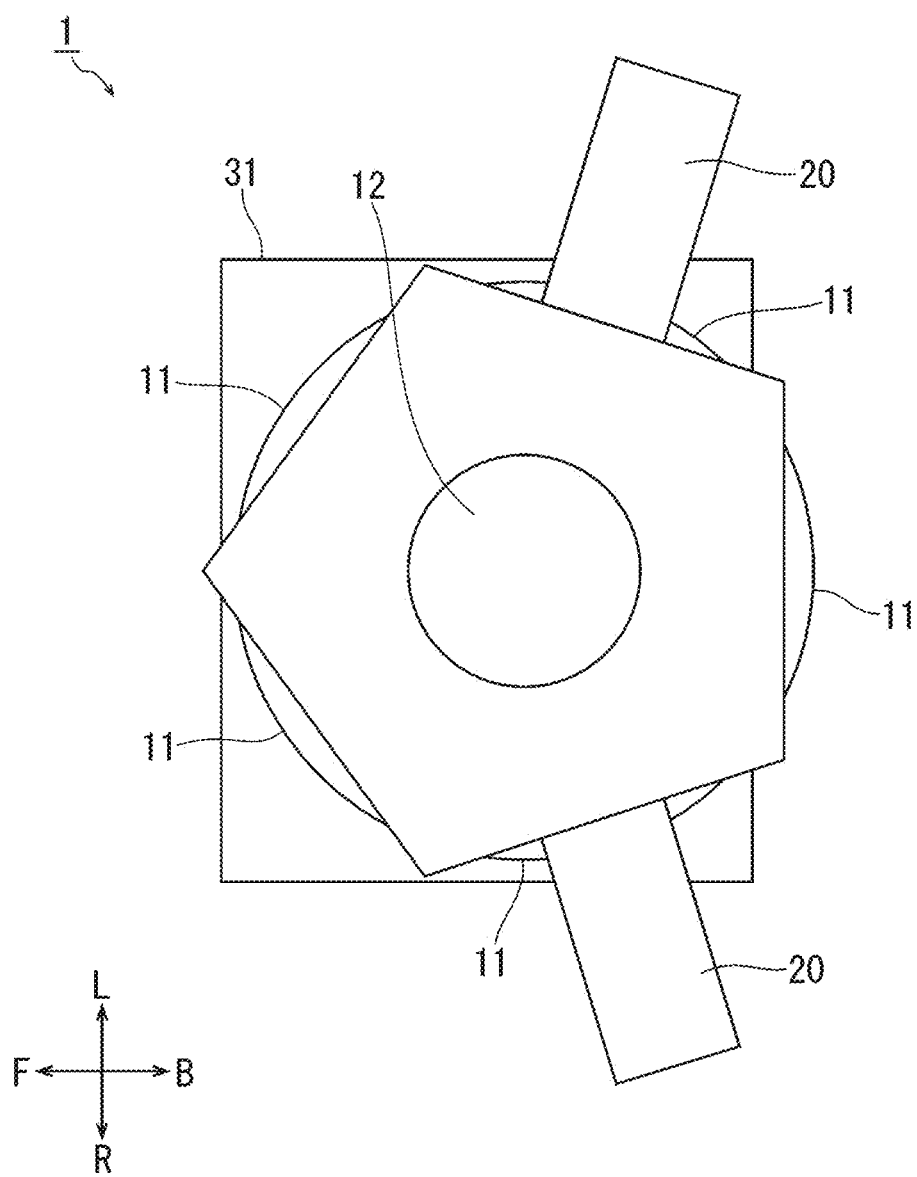
FIG. 11 A plan view of an alternative example of the measuring apparatus.

An alternative measuring apparatus 1, as shown in FIG. 11, includes a pair of right and left scanners 20 each is fixed on a rear side of the head portion 13 of the omnidirectional camera 10 and is oriented to the upward and sideward direction. Similarly to the embodiment described the above, the configuration can obtain data in a wide range while preventing one of the omnidirectional camera 10 and the scanners 20 from entering the other.

The vehicle for moving the measuring apparatus 1 is not limited to the car 40. Any other movable means including a dolly, a flying object, a ship, a bicycle, or automatic conveyer can be used as the vehicle.

While the scanner 20 is fixed on the rear of the head portion 13 of the omnidirectional camera 10 in the embodiments, the scanner 20 may be at any positions in the circumferential direction of the head portion 13. The layout has similar effect to that of the embodiments described above. This means that a fixed position of the scanner 20 may be changed with respect to the shape of the vehicle and/or the moving direction. For example, when the fixed position of the scanner 20 is at the forward side of the vehicle, the scanner 20 is disposed at a front end of the head portion 13 of the omnidirectional camera 10. From this, the system is capable of preventing the images of the vehicle from entering the data of the omnidirectional camera 10 and the scanners 20.

In the measuring apparatus 1, the scanner 20 is fixed on the omnidirectional camera 10 and locational information of the measuring apparatus 1 can be obtained constantly by the inertia measuring unit 30. Therefore, an assembling minor error can be corrected by software based on the locational information after the assembly. Furthermore, while a measuring apparatus is required to have vibration-durability for use on the vehicle, the measuring apparatus 1 can obtain correct locational information by the inertia measuring unit 30. Therefore, a flexible configuration may be adopted intentionally in the measuring apparatus 1 against the vibration.

While the embodiments and the alternative examples of the present invention have been described, these are examples of the present invention, and the respective examples and alternative examples can be combined based on the knowledge of a skilled technician. The combined embodiments are included in the scope of the present invention.

DESCRIPTION OF SYMBOLS

1 . . . measuring apparatus
10 . . . omnidirectional camera
11 . . . side camera
12 . . . upper camera
13 . . . head portion of omnidirectional camera
θ 11, θ 12 . . . viewing angle of camera
20 . . . scanner
θ 20 . . . viewing angle of scanner
30 . . . inertia measuring unit
40 . . . car (vehicle)
41 . . . GNSS antenna
42 . . . wheel encoder
52 . . . stand
521 . . . inclined portion
53 . . . frame
532 . . . arm

The invention claimed is:

1. A measuring apparatus for constructing a three-dimensional model comprising:
   an inertia measuring unit including an accelerometer and a gyroscope that obtains an acceleration and angular speed of the measuring apparatus in three-dimensions;
   an omnidirectional camera including an upper camera and at least one side camera that photographs scenery of an upward direction and a sideward direction, the omnidirectional camera including an image sensor and having a vertical axis; and
   a scanner for scanning scenery over 360 degrees in a circumferential direction and having a rotational axis around which the scanner rotates;
   wherein the inertia measuring unit, the omnidirectional camera, and the scanner are disposed in this order from the bottom of the measuring apparatus,
   the rotational axis of the scanner is disposed in an inclined angle toward a backward direction relative to the vertical axis of the omnidirectional camera, and
   the scanner is fixed on a rear end portion of a head portion of the omnidirectional camera above all of the cameras of the omnidirectional camera and performs rotary scanning around the rotational axis,
   wherein the scanner is positioned in a gap between a viewing angle of the upper camera and a viewing angle of the at least one side camera.

2. The measuring apparatus according to claim 1, wherein the scanner is disposed outside of all areas of viewing angles of the upper camera that photographs the scenery of the upward direction and of all areas of viewing angles of the at least one side camera that photographs the scenery of the sideward direction of the omnidirectional camera.

3. The measuring apparatus according to claim 1, wherein the rotational axis is inclined at an angle of 45 degrees with respect to the vertical axis of the omnidirectional camera.

4. A system for constructing a three-dimensional model comprising:
   a measuring apparatus including an inertia measuring unit including an accelerometer and a gyroscope that obtains an acceleration and angular speed of the measuring apparatus in three-dimensions;
   an omnidirectional camera including an upper camera and at least one side camera that photographs scenery of an upward direction and a sideward direction, the omnidirectional camera being fixed on an upper surface of the inertia measuring unit, and the omnidirectional camera including an image sensor and having a vertical axis; and
   a scanner for scanning scenery over 360 degrees in a circumferential direction and having a rotational axis around which the scanner rotates; and
   a vehicle equipped with the measuring apparatus on a rear portion of a roof of the vehicle, wherein
   the inertia measuring unit, the omnidirectional camera, and the scanner are disposed in this order from the bottom of the measuring apparatus,
   the rotational axis of the scanner is disposed in an inclined angle toward a backward direction relative to the vertical axis of the omnidirectional camera, and
   the scanner is fixed on a rear end portion of a head portion of the omnidirectional camera above all of the cameras of the omnidirectional cameras and performs rotary scanning around the rotational axis,
   wherein the scanner is positioned in a gap between a viewing angle of the upper camera and a viewing angle of the at least one side camera.

5. The system according to claim 4, wherein the measuring apparatus further comprises a stand having right and left surfaces, the stand being respectively provided on the right and left surfaces with an inclined portion, and the measuring apparatus being fixed on the vehicle by means of a frame having a pawl-shaped arm adapted to engage with the inclined portion.

6. The measuring apparatus according to claim 1, wherein the scanner is an optical scanner.

7. The measuring apparatus according to claim 6, wherein the scanner is a laser scanner.

8. The system according to claim 4, wherein the scanner is an optical scanner.

9. The system according to claim 8, wherein the scanner is a laser scanner.

10. The system according to claim 4, wherein the image sensor is a digital image sensor.

11. The measuring apparatus according to claim 1, wherein the image sensor is a digital image sensor.

12. The measuring apparatus according to claim 1, wherein the upper camera of the omnidirectional camera is mounted on the head portion, and the scanner is fixed on the side of the head portion in such a position that the an image of the scanner is not taken into either the upper camera or the side camera.

13. A measuring apparatus for constructing a three-dimensional model comprising:

an inertia measuring unit including an accelerometer and a gyroscope that obtains an acceleration and angular speed of the measuring apparatus in three-dimensions;

an omnidirectional camera including an upper camera and at least one side camera that photographs scenery of an upward direction and a sideward direction, the omnidirectional camera including an image sensor and having a vertical axis; and a scanner for scanning scenery over 360 degrees in a circumferential direction and having a rotational axis around which the scanner rotates;

wherein the inertia measuring unit, the omnidirectional camera, and the scanner are disposed in this order from the bottom of the measuring apparatus, the rotational axis of the scanner is disposed in an inclined angle toward a backward direction relative to the vertical axis of the omnidirectional camera, and the scanner is fixed on a side of a head portion of the omnidirectional camera above all of the cameras of the omnidirectional camera and performs rotary scanning around the rotational axis, wherein the scanner is positioned in a gap between a viewing angle of the upper camera and a viewing angle of the at least one side camera.

* * * * *